US006173986B1

(12) United States Patent
Sicher

(10) Patent No.: US 6,173,986 B1
(45) Date of Patent: Jan. 16, 2001

(54) ROWING ARMS DRIVEN WHEEL CHAIR

(76) Inventor: Jack Sicher, 2010 Seagrape Ave., Pembroke Pines, FL (US) 33026

( * ) Notice: Under 35 U.S.C. 154(b), the term of this patent shall be extended for 0 days.

(21) Appl. No.: 09/327,002

(22) Filed: Jun. 7, 1999

(51) Int. Cl.[7] ...... B62M 1/00

(52) U.S. Cl. ...... 280/647; 280/253; 280/242.1; 280/246; 280/639

(58) Field of Search ...... 280/647, 649, 280/250.1, 242.1, 243, 244, 246, 252, 253

(56) References Cited

U.S. PATENT DOCUMENTS

| | | | | |
|---|---|---|---|---|
| 4,925,200 | * | 5/1990 | Jones | 280/244 |
| 5,007,655 | * | 4/1991 | Hanna | 280/250.1 |
| 5,020,815 | | 6/1991 | Harris et al. | 280/246 |
| 5,112,072 | | 5/1992 | Korosue | 280/240 |
| 5,263,729 | | 11/1993 | Watwood et al. | 280/246 |
| 5,301,971 | | 4/1994 | Brereton et al. | 280/250 |
| 5,509,673 | | 4/1996 | Wu et al. | 280/250.1 |
| 5,826,897 | * | 10/1998 | Beard | 280/250.1 |
| 5,865,455 | * | 2/1999 | Taylor | 280/250.1 |
| 5,876,052 | * | 3/1999 | Olson et al. | 280/244 |
| 5,941,547 | * | 8/1999 | Drake | 280/243 |

* cited by examiner

*Primary Examiner*—Brian L. Johnson
*Assistant Examiner*—Tony Winner
(74) *Attorney, Agent, or Firm*—Oltman, Flynn & Kubler

(57) ABSTRACT

A wheel chair is provided, including a wheel chair frame including a seat portion, an axle structure and two lateral wheels mounted to the axle structure for rolling the wheel chair over a support surface; and a manual propulsion mechanism including first and second clutches mounted to the wheel axle structure, each of the clutches having an outer clutch drum which engages and rotates an internal clutch core affixed to the wheel axle structure when rotated in one direction and disengages the clutch core and spins freely when rotated in the opposing direction; a lever arm affixed to a lever arm axle rotatably fitted through the frame to a drive cable pulley; a drive cable engagingly wrapped around the drive cable pulley and engagingly around the first clutch drum, and extending from the first clutch drum engagingly around a reversing pulley rotatably mounted on a pulley stem secured to the frame, and from the reversing pulley engagingly around the second clutch drum wound in the opposite direction from its winding around the first clutch drum, and then returning to the drive cable pulley to form a continuous cable loop; so that pivoting the lever arm in either direction causes one of the clutches to engage and propel the wheel chair.

10 Claims, 8 Drawing Sheets

ROWING ARMS DRIVEN WHEEL CHAIR

BACKGROUND OF THE INVENTION

1. Field of the Invention

The present invention relates generally to the fields of equipment for aiding the disabled and to medical equipment. More specifically the present invention relates to a wheel chair having a lever arm propulsion mechanism and a collapsible frame with spaced apart first and second wheels, the wheels being affixed to first and second wheel half-axles. The propulsion mechanism includes first and second clutches secured to corresponding first and second wheel half-axles. Each clutch has an outer clutch drum which engages and rotates an internal clutch core affixed to the given half-axle when rotated in one direction and disengages the core and spins freely about the core when rotated in the opposing direction. A lever arm is pivotally mounted to the frame and is affixed to a lever arm axle fitted to a drive cable pulley, and a drive chain or cable is engagingly wrapped around the drive cable pulley and engagingly wrapped twice around the first clutch drum. The cable extends from the first clutch drum engagingly around a reversing pulley rotatably mounted on a pulley stem secured to the frame, and from the reversing pulley is engagingly wrapped twice around the second clutch drum in the opposite direction from its winding around the first clutch drum, and then returns to the drive cable pulley to form a closed cable loop.

Rotation of the first and second clutch drums about the wheel half-axle in opposing rotational directions causes the first clutch to drive the wheel axle in a forward rotational direction while second clutch does not engage, and rotation of the first and second clutch drums about the wheel axle in reversed opposing rotational directions causes the second clutch to drive the wheel axle in a forward rotational direction while the first clutch does not engage. As a result of this construction, pivoting the lever arm in a forward direction rotates the first clutch drum in a first rotation direction and thereby drives the wheel half-axle and wheel forwardly, and pivoting the lever arm in the opposite, second rotational direction continues to drive the wheel half-axle and wheel forwardly. Thus no movement of the lever arm is wasted, and maximum efficiency is achieved because all movement of the lever arm causes forward wheel half-axle and wheel rotation.

2. Description of the Prior Art

There have long been wheel chairs for mobilizing the injured and disabled, either under the power of an assistant pushing the chair or under the power of the chair occupant or user. In the latter instance, prior art wheel chairs have been highly inefficient because the user typically has to grip an outer ring on the side of a chair wheel and rotate the wheel a few degrees, slide the hand back and rotate it a few more degrees. This is inefficient because half of the hand movement, that is, sliding the hand back to begin rolling the wheel again, delivers no propelling drive to the wheel. Another problem is that the arm and chest muscles must be exerted while the arms are in an awkward position, causing soreness and fatigue. Still another problem has been that the chairs collapse inefficiently and have two forward caster wheels, making turning a high friction-resistance exercise.

It is thus an object of the present invention to provide a wheel chair which can be powered by hand with the arms in a comfortable and maximized muscle power delivery position.

It is another object of the present invention to provide such a wheel chair which delivers muscle power to the wheels throughout the entire arm motion cycle, so that speed and efficiency are maximized.

It is still another object of the present invention to provide such a wheel chair which folds compactly and efficiently, and which has only one, central forward caster wheel, so that turning friction from rotating the caster wheel axle structure is minimized.

It is finally an object of the present invention to provide such a wheel chair which is relatively inexpensive to manufacture and is sturdy and reliable.

SUMMARY OF THE INVENTION

The present invention accomplishes the above-stated objectives, as well as others, as may be determined by a fair reading and interpretation of the entire specification.

A wheel chair is provided, including a wheel chair frame including a seat portion, an axle structure and two lateral wheels mounted to the axle structure for rolling the wheel chair over a support surface; and a manual propulsion mechanism including first and second clutches mounted to the wheel axle structure, each of the clutches having an outer clutch drum which engages and rotates an internal clutch core affixed to the wheel axle structure when rotated in one direction and disengages the clutch core and spins freely when rotated in the opposing direction; a lever arm affixed to a lever arm axle rotatably fitted through the frame to a drive cable pulley; a drive cable engagingly wrapped around the drive cable pulley and engagingly around the first clutch drum, and extending from the first clutch drum engagingly around a reversing pulley rotatably mounted on a pulley stem secured to the frame, and from the reversing pulley engagingly around the second clutch drum wound in the opposite direction from its winding around the first clutch drum, and then returning to the drive cable pulley to form a continuous cable loop; so that pivoting the lever arm in one direction rotates the first and second clutch drum about the wheel axle structure in opposing first rotational directions so that the first clutch drives the wheel axle structure in a forward rotational direction while second clutch does not engage, and pivoting the lever arm in the opposite rotational direction to rotate the first and second the clutch drums about the wheel axle in second opposing rotational directions causing the second clutch to drive the wheel axle structure in a forward rotational direction while the first clutch does not engage.

The wheel chair preferably additionally includes a tensioning pulley biased against the cable with a pulley biasing mechanism. The wheel chair preferably still additionally includes a turnbuckle in the cable for adjusting cable tension.

The wheel chair frame is preferably collapsible and includes two spaced apart wheels, each wheel being affixed to a wheel half-axle; a seat made up of two U-shaped lateral seat support bars, each pivotally secured at its rearmost end to a corresponding upright lateral backrest support bars, so that one of the wheel half-axles fits through a passageway extending through the frame at the intersection of the seat support bars and the backrest support bars on each side of the chair; a flexible seat fabric sheet extending between the lateral seat support bars; a flexible backrest fabric sheet extending between the lateral backrest support bars; a first rear strut pivotally connected to each of the backrest support bars and extending toward the center of the frame, where each of the rear pivot struts is pivotally connected to a rearward interconnection bracket; where the two wheel half-axles are each pivotally connected at their inward ends to the rear interconnection bracket; a forward interconnection bracket; a second pivot strut pivotally connected to each of the seat support bars and to a forward interconnection bracket; so that the lateral seat and backrest support bars are pivotable on the pivot struts to fold toward each other to bring the chair into a compact storage configuration and to fold back away from each other to bring the chair into a operational configuration, while the flexible seat and backrest fabric sheets collapse and unfold with the folding and unfolding, respectively, of the chair; and a forward wheel and forward wheel support mechanism.

The wheel chair preferably additionally includes a generally L-shaped arm rest bar pivotally connected at one end to the corresponding seat support bar and at the other end to the corresponding backrest support bar, and an elongate arm platform connected to the upper surface of the arm rest bar; the arm rest bars each including a break point joined with a pivot pin so that as the chair folds the back rest support bars pivot toward the seat support bars, and the arm rest bar pivots at the break point and at its connection points to the corresponding the arm rest support bar and the corresponding seat support bar.

The forward wheel support mechanism preferably includes a foot rest bar pivotally having a foot support structure and being connected to the forward interconnection bracket by a pivot plate, pivotally secured to forward end of the forward interconnection bracket; a central beam extending horizontally substantially along the longitudinal center of the chair, from front to rear, joining the forward and rearward interconnection brackets.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
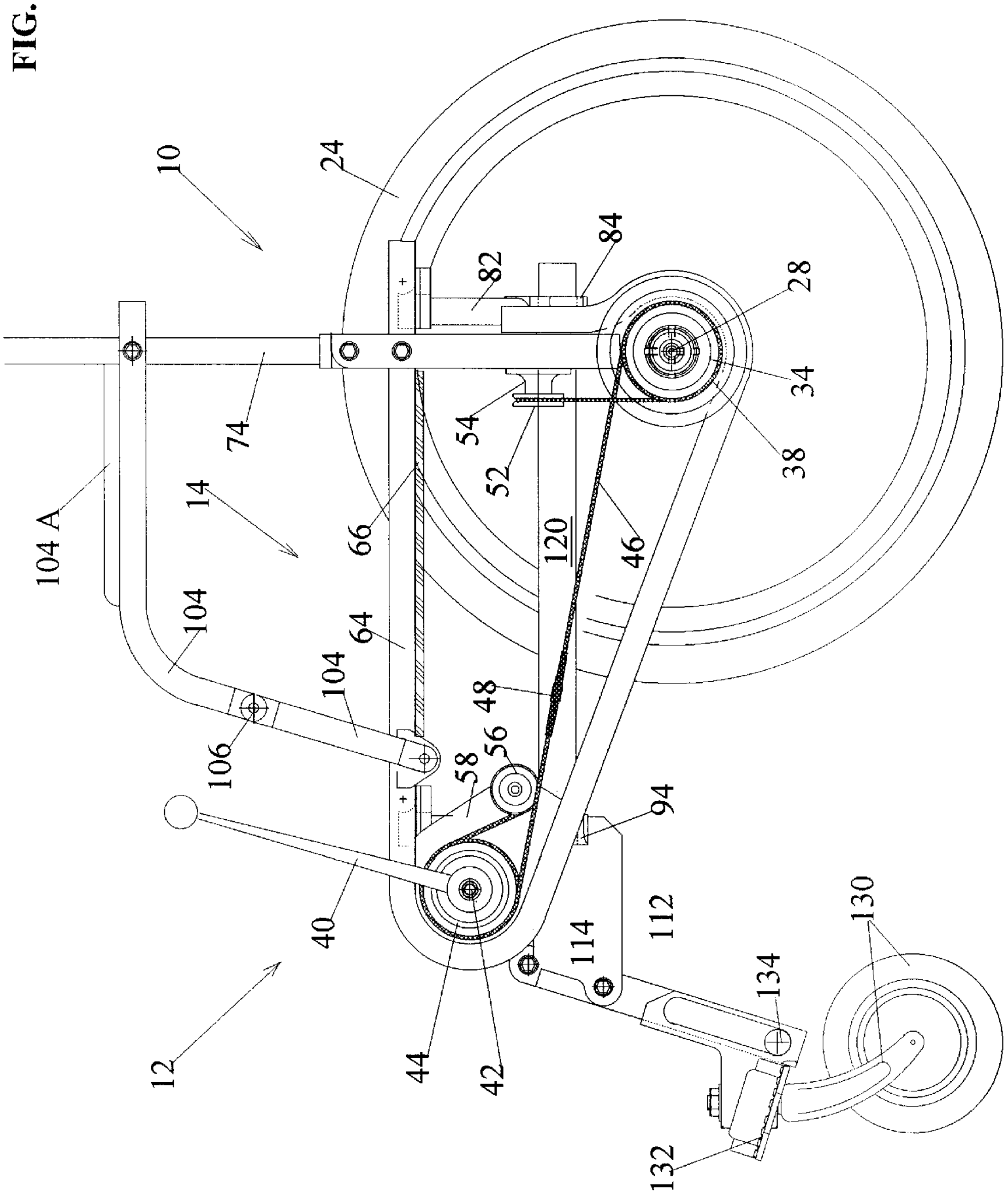
FIG. 1 is a cross-sectional side view of the inventive wheel chair, shown cut longitudinally and just forwardly of its mid-section, revealing the preferred drive mechanism.
Figure 2:
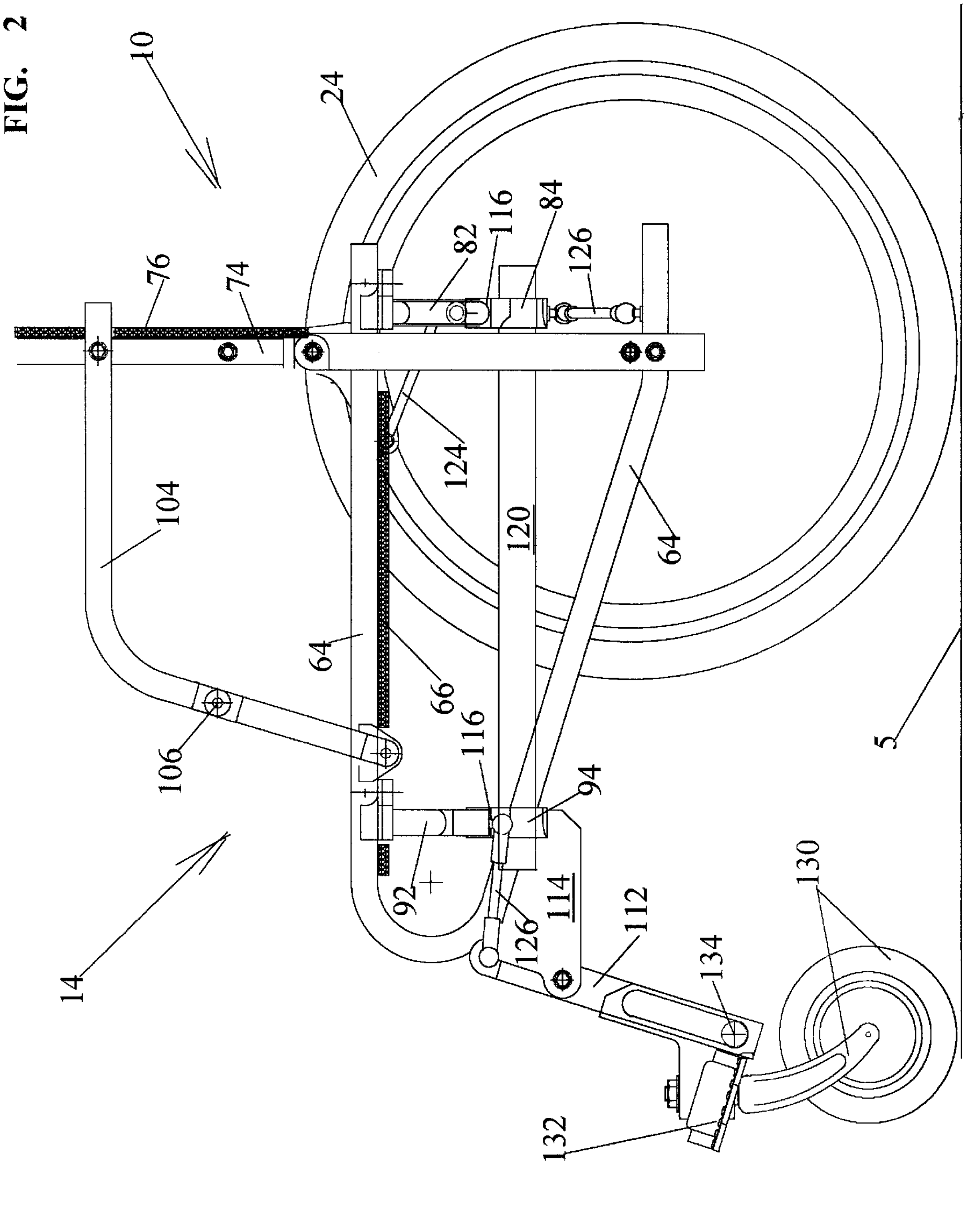
FIG. 2 is a longitudinal cross-sectional view as in FIG. 1, but cut deeper into the view.
Figure 3:
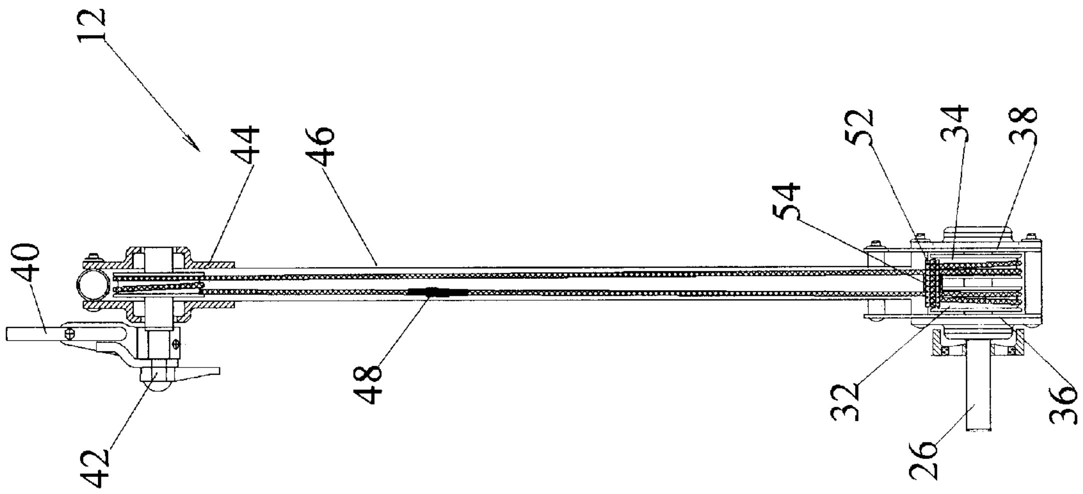
FIG. 3 is a cross-sectional top view of the preferred drive mechanism, showing the first and second clutches, the cable, and the drive pulley and pivot arm shaft.
Figure 4:
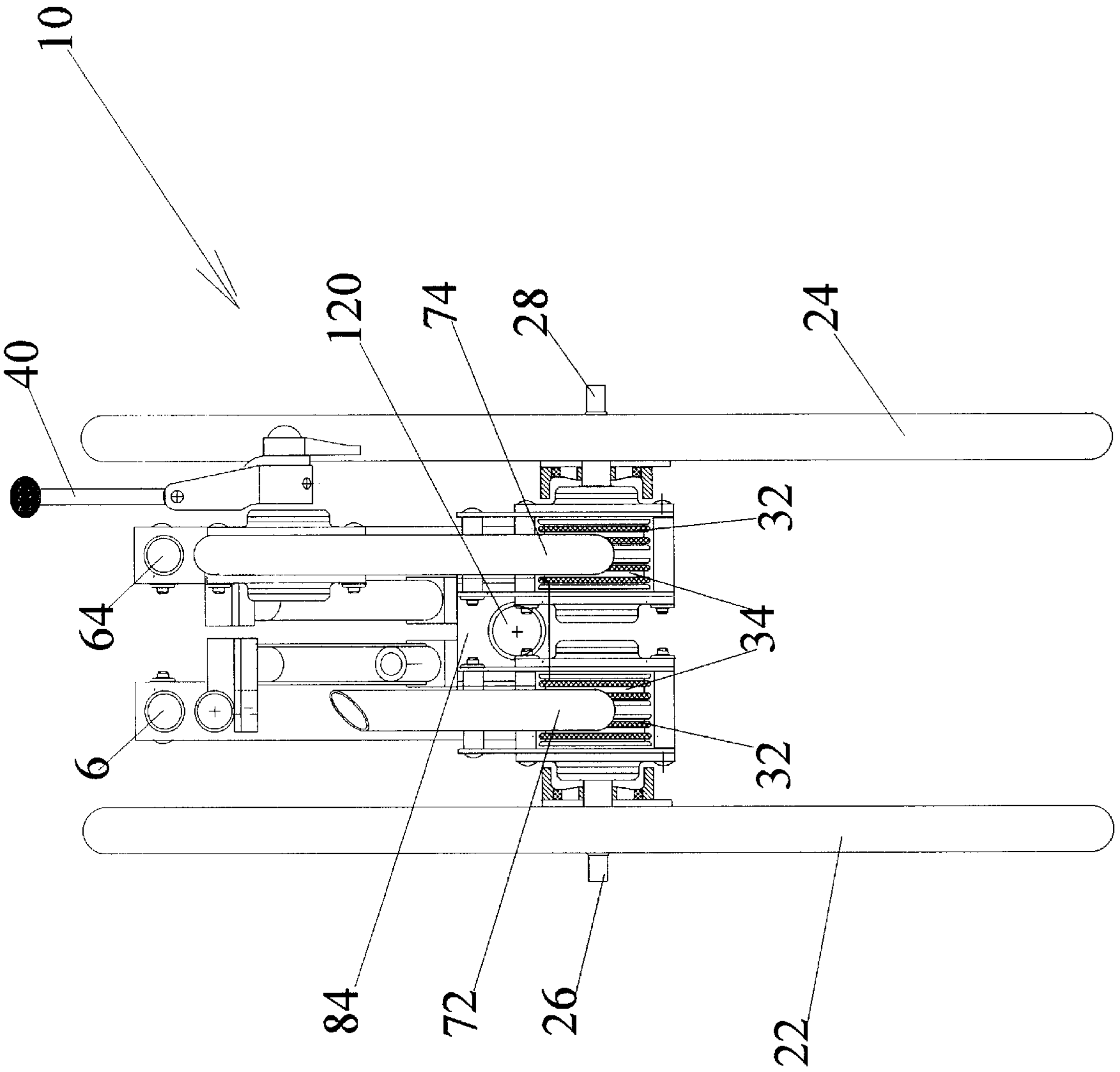
FIG. 4 is a rear view of the chair in its collapsed configuration, with portions cut away to reveal the preferred opposing drive mechanisms.
Figure 5:
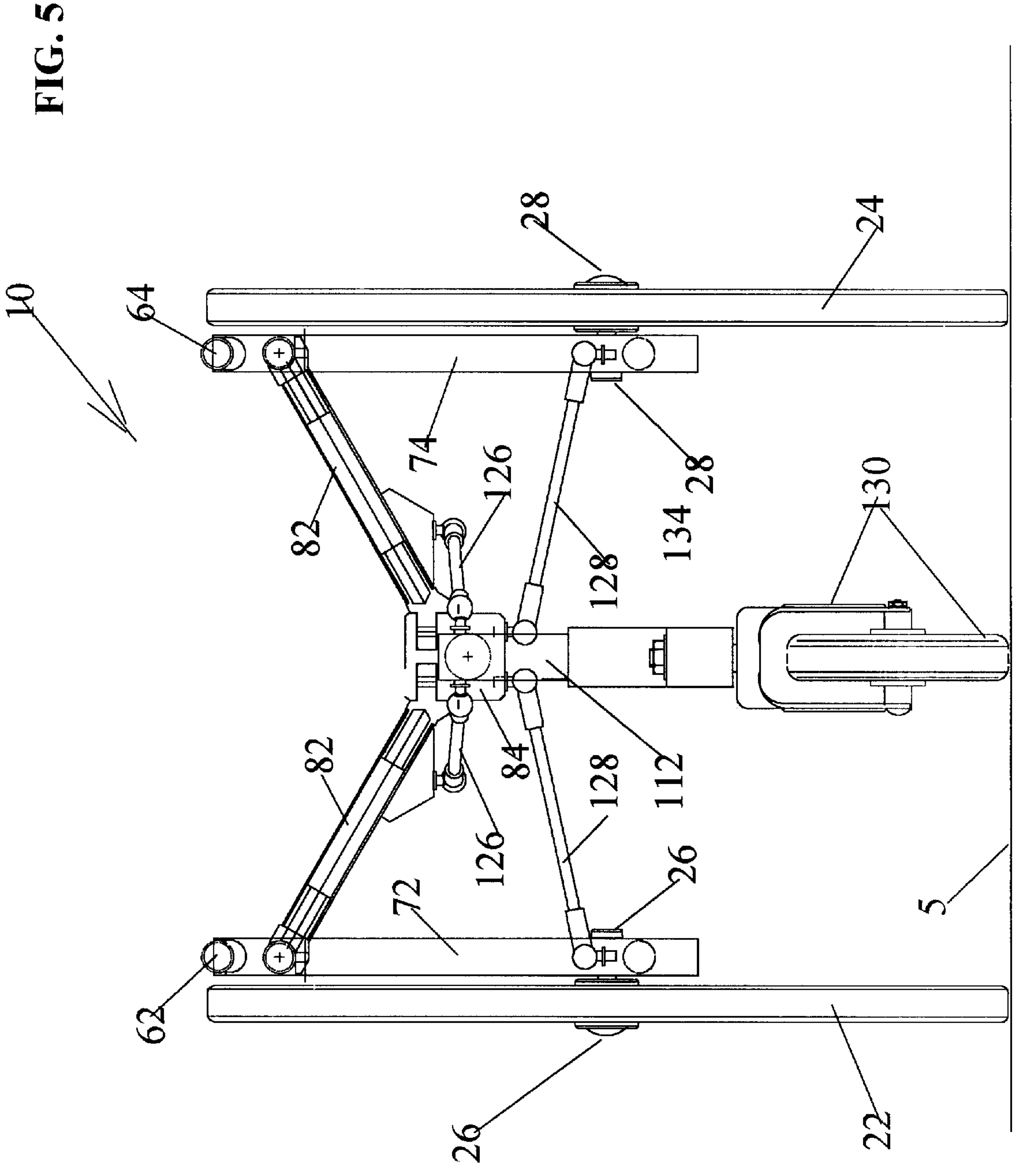
FIG. 5 is a view as in FIG. 4, with the chair unfolded into its operational configuration.
Figure 6:
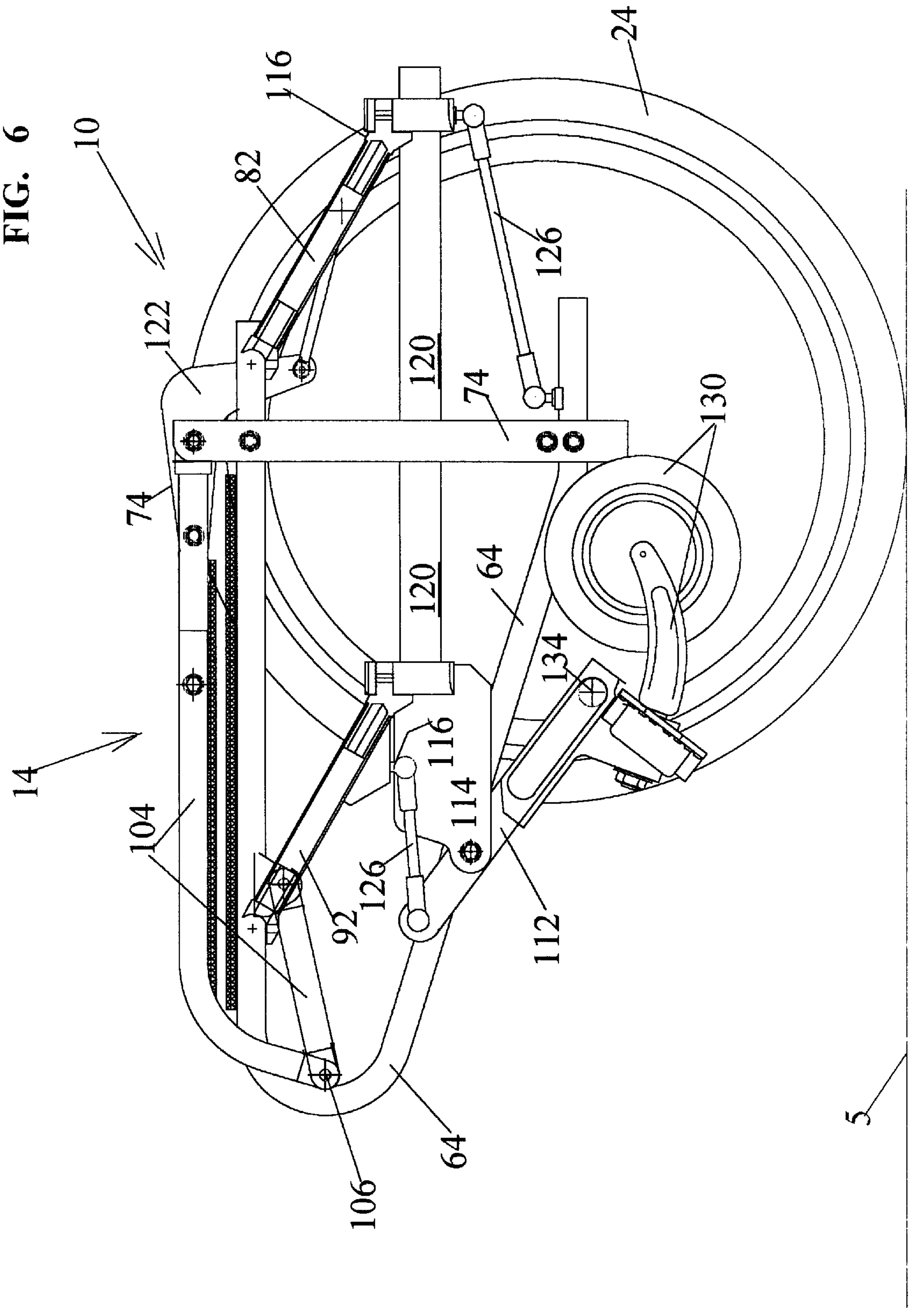
FIG. 6 is a side view of the chair in its folded configuration.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, a wheel chair 10 is disclosed having a lever arm propulsion mechanism 12 and a collapsible frame 14 with spaced apart first and second wheels 22 and 24, the wheels being affixed respectively to first and second wheel half-axles 26 and 28. The propulsion mechanism 12 includes first and second clutches 32 and 34 secured to corresponding first and second wheel half-axles 32 and 34. Each clutch 32 and 34 has an outer clutch drum 36 and 38, respectively, which engages and rotates an internal clutch core (not shown) affixed to the given half-axle 26 and 28 when rotated in one direction and disengages the core and spins freely about the core when rotated in the opposing direction. A lever arm 40 is pivotally mounted to the frame 14 and is affixed to a lever arm axle 42 fitted to a drive cable pulley 44, and a drive cable 46 is engagingly wrapped around the drive cable pulley 44 and engagingly wrapped twice around the first clutch drum 36. Cable 46 extends from the first clutch drum 36 engagingly around a reversing pulley 52 rotatably mounted on a reversing pulley stem 54 secured to frame 14, and from reversing pulley 52 is engagingly wrapped twice around the second clutch drum 38 in the opposite direction from its winding around the first clutch drum 36, and then returns to the drive cable pulley 44, to form a closed cable 46 loop. Cable 46 preferably includes a turn buckle 48 for adjusting cable 46 tension and for cable 46 removal during servicing. A cable tensioning pulley 56 is preferably secured to the frame 14 on a spring-loaded pivot arm 58 which biases the pulley 56 against the cable 46. This tensioning pulley 56 serves to bring the cable 46 segment coming off the top of one drum 36 or 38 to the level of the other cable segment coming off the bottom of the other drum 38 or 36.

Pivoting the lever arm 40 one way causes rotation of the first and second clutch drums 36a and 38a about the given wheel half-axle 26 or 28 in first opposing rotational directions causes the first clutch 32 to drive the given wheel half-axle in a forward rotational direction while second clutch 34 does not engage, and pivoting the lever arm 40 the other way causes rotation of the first and second clutch drums 36 and 38 about the given wheel half-axle in reversed, second opposing rotational directions, causing the second clutch 34 to drive the given wheel half-axle in a forward rotational direction while the first clutch 32 does not engage. As a result of this construction and operation, pivoting the lever arm 40 in a forward direction rotates the first clutch drum in a first rotation direction and thereby drives the given wheel half-axle and wheel forwardly, and pivoting the lever arm 40 in the opposite, second rotational direction continues to drive the given wheel half-axle and wheel forwardly. Thus no movement of the lever arm 40 is wasted, and maximum efficiency is achieved because all movement of the lever arm 40 causes forward wheel half-axle and wheel rotation.

The lever arm 40 rowing action of the present wheel chair 10 is twice as efficient as the rowing action of oars on a boat, for example, because on a boat the backswing of each oar displaces no water drive the boat through the water. The present wheel chair 10 is also twice as efficient as the hand rotation of wheel chair wheels as is done with most prior wheel chairs, because once the hand has rotated the wheel a certain distance forward, the hand must disengage from the wheel and slide back to a rearward position on the wheel to rotate it forwardly once again. This disengagement and rearward hand movement imparts no forward drive to the wheel, so that drive is supplied intermittently rather than continuously as in the present invention. Furthermore, two such propulsion mechanisms 12 are preferably provided on the present wheel chair 10, one on each side, so that both wheels 22 and 24 are engaged and driven.

The collapsible frame 14 preferably includes a seat made up of two generally U-shaped lateral seat support bars 62 and 64 pivotally secured at their rearmost ends to two corresponding spaced apart upright lateral backrest support bars 72 and 74. A flexible seat fabric sheet 66 is stretched between the lateral seat support bars 62 and 64 and a flexible backrest fabric sheet 76 is stretched between the lateral backrest support bars 72 and 74. One of the wheel half-axles 26 or 28 fits through a passageway extending through the frame 14 at or near the intersection of the seat support bars 62 or 64 and the backrest support bars 72 or 74 on each side of chair 10.

A rear pivot strut 82 is pivotally connected to the rear of each of the backrest support bars 72 and 74 and extends toward the center of the frame 14, where it is pivotally connected to a rearward interconnection bracket 84. See FIG. 5. The two wheel half-axles 26 and 28 are each pivotally connected at their inward ends to rearward interconnection bracket 84 as well. A forward pivot strut 92 is pivotally connected to the forward portion of each seat support bar 62 and 64, and the forward pivot struts 92 each pivotally connect to a forward interconnection bracket 94. As a result of this construction, the lateral seat and backrest support bars 62 and 64, and 72 and 74, respectively, can be pivoted on the pivot struts 82 and 92 to fold toward each other to bring the chair 10 into a compact storage configuration and to back away from each other to bring the chair 10 into an open, operational configuration. The flexible seat and backrest fabric sheets 66 and 76 collapse and stretch with the folding and unfolding, respectively, of the chair 10. A generally L-shaped arm rest bar 102 or 104 is pivotally connected at one end to the forward end of the corresponding seat support bar 62 or 64 and at the other end to the middle of the corresponding backrest support bar 72 or 74, and an elongate arm platform 102*a* or 104*a* is connected to the horizontal upper surface of the arm rest bar 102 or 104. The arm rest bars 102 and 104 each include a break point joined with a pivot pin 106 so that the chair 10 may be further folded by pivoting the back rest support bars 72 and 74 toward the seat support bars 62 and 64, so that the arm rest bar 102 and 104 pivots at the break point and at its connection points to the corresponding arm rest support bar 62 or 64 and the corresponding seat support bar 72 and 74.

A foot rest bar 112 is pivotally connected to the forward interconnection bracket 94 by a pivot plate 114, pivotally secured to forward end of the forward interconnection bracket 94. A central beam 120 extends horizontally along the longitudinal center of the chair 10, from front to rear, joining the forward and rearward interconnection brackets 94 and 84, respectively. The bottom hinges 116 are aligned with the center line of the pivot struts 82 and 92, but the top hinges 110 are eccentrically mounted, preferably approximately one inch, from the center line of the pivot struts 82 and 92, thus providing a positive lock of the folding system as long as there is a vertical force applied to the seat portion. The lower surface of the rear, upper portions of the seat support bars 62 and 64 each have a downward extension 122 and a downward extension rod 124 connecting them to the strut 92. The foot-rest bar 112 extends forwardly, terminating in a caster wheel 130 which rests on the ground, hereinafter the chair support surface S. Two opposing foot-rest bar pivoting rods 126 are pivotally connected to strut 92 at one end to the forward interconnection bracket 92 and at the other end to the foot-rest bar 112 upper end, above the foot-rest pivot connection to the pivot plate 114. Lateral pivot rods 128 pivotally interconnect lateral back rest support bars 72 and 74 and either foot rest bar 112 or rearward interconnection bracket 84. As a result, when forward pivot struts 92 are pivoted ninety degrees forward to enter a horizontal plane, the pivoting rods 126 pivot the foot rest bar 112 upper end forwardly, bringing the foot rest bar 112 lower end and caster wheel 130 backwardly and upwardly toward the central beam 120 and between the first and second wheels 22 and 24. See FIGS. 4 and 6. Thus the sides of the chair 10 fold inwardly toward each other while the backrest portion folds forwardly and the footrest bar 112 folds rearwardly and upwardly, bringing the chair 10 into a compact configuration for transport and storage. These movements all reverse to unfold the chair 10 for use.

Two laterally pivotal foot-rest panels 132 are rotatably mounted on a footrest axle 134 passing through the foot-rest bar 112 lower end and swing to a generally horizontal position for user foot support, and to a compact upright position for chair 10 storage. A stop element (not shown) prevents the foot-rest panels 132 from pivoting below the horizontal position. A telescoping inner tube slotted to pass axle 134 and outer tube construction is preferably used at the foot rest bar 112 lower end to permit adjusting the foot rest 132 upward or downward to accommodate users of different heights.

Second Preferred Embodiment

Figure 7:
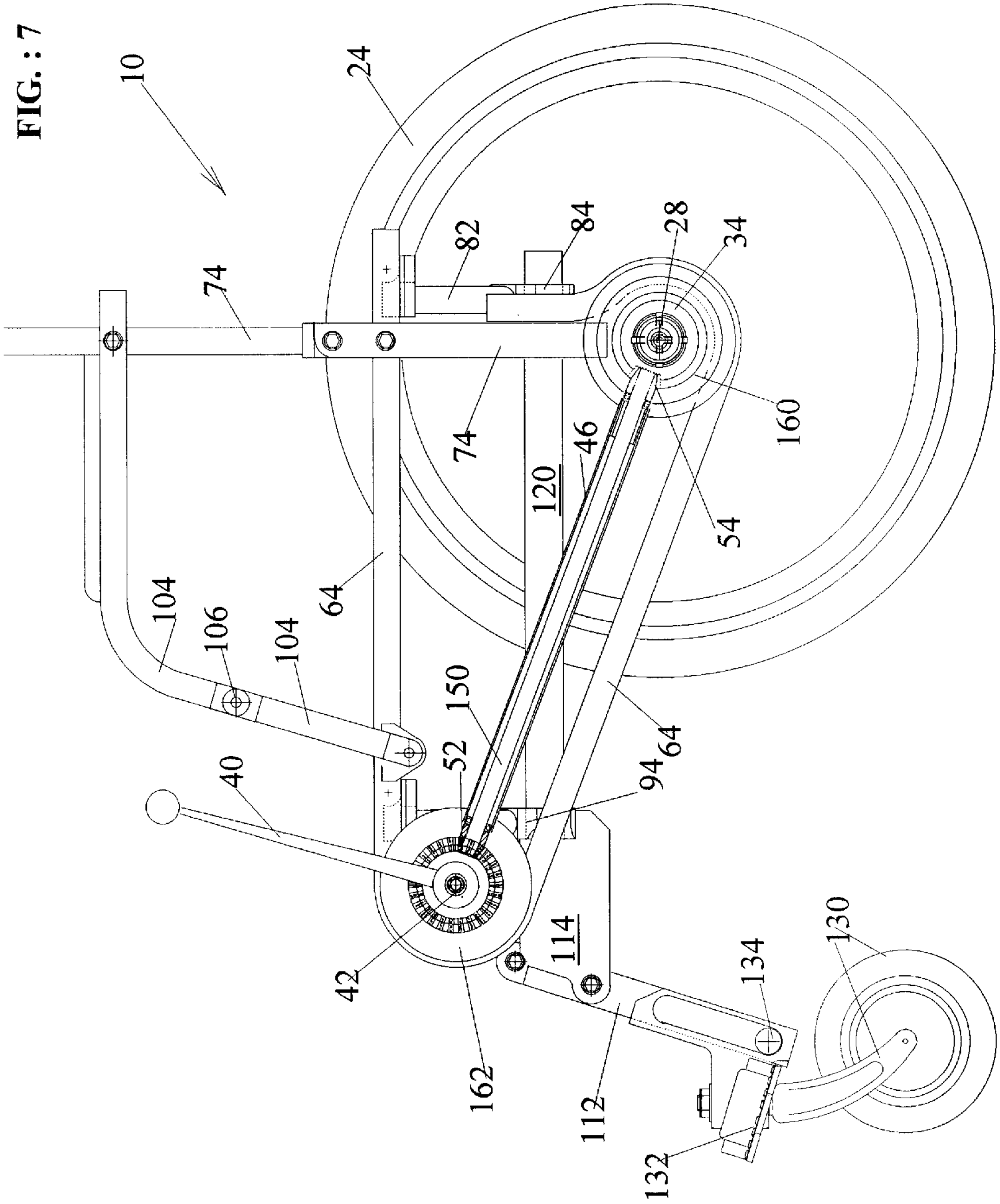
FIG. 7 is a longitudinal cross-sectional side view of the second embodiment showing the alternative drive shaft drive mechanism.
Figure 8:
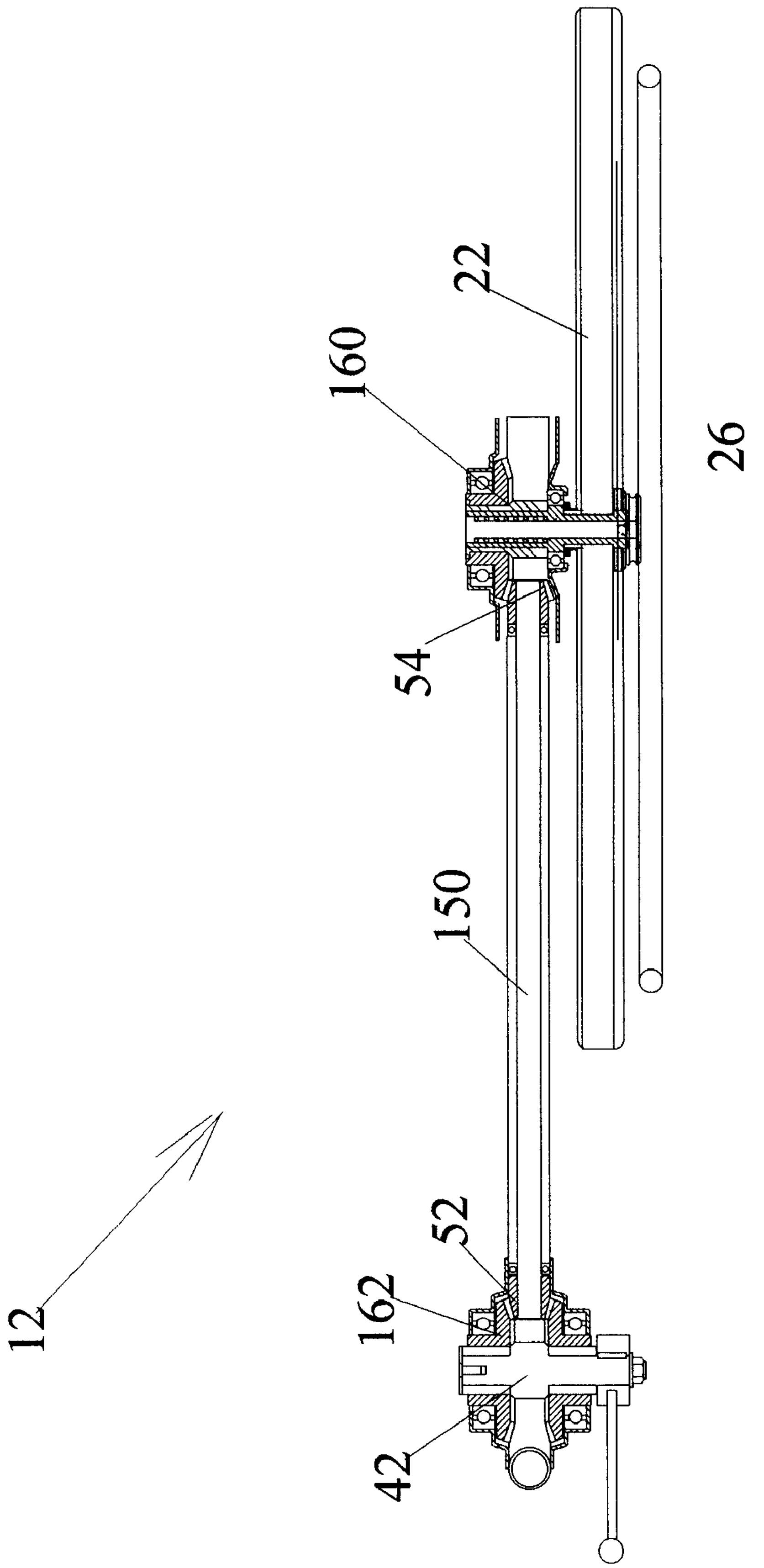
FIG. 8 is a cross-sectional top view of one side of the chair of the second embodiment, showing the alternative drive mechanism from the top.

A second embodiment is shown in FIGS. 7 and 8, in which a drive shaft 150 replaces the cable 46. Drive shaft 150 has two opposing beveled ends 152 and 154 with gear teeth. The teeth on end 152 mesh with teeth on a laterally beveled drive gear 162 secured to the lever arm axle 42, and the teeth on end 154 mesh with teeth in a drive transmission gear structure 160 which delivers torque to the wheel 22 or 24. The drive transmission structure 160 includes two opposing laterally one beveled transmission gears 164 which mesh on opposing sides with drive shaft end 154, each transmission gear 164 drivably engaging one of the clutch drums 36 and 38. As the lever arm 40 is pivoted one way, the drive shaft 150 rotates in one rotational direction and thereby rotates one clutch drum 36 to engage the half-axle while the other drum 38 spins freely about its core without engaging. Then, as the lever arm 40 is pivoted in the opposing direction, the drive shaft 150 rotates in the opposing rotational direction and thereby rotates the other clutch 38 to engage the half axle while drum 36 spins freely about its core without engaging.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A wheel chair, comprising:

a wheel chair frame including a seat portion, axle means and two lateral wheels mounted to said axle means for rolling the wheel chair over a support surface;

and a manual propulsion mechanism comprising first and second clutches mounted to said wheel axle means, each said clutch having an outer clutch drum which engages and rotates an internal clutch core affixed to said wheel axle means when rotated in one direction and disengages said clutch core and spins freely when rotated in the opposing direction; a lever arm affixed to a lever arm axle rotatably fitted through the frame to a drive cable pulley; a drive cable engagingly wrapped around said drive cable pulley and engagingly around the first said clutch drum, and extending from the first said clutch drum engagingly around a reversing pulley rotatably mounted on a pulley stem secured to said frame, and from said reversing pulley engagingly around the second clutch drum wound in the opposite direction from its winding around the first said clutch drum, and then returning to the drive cable pulley to form a continuous cable loop;

such that pivoting said lever arm in one direction rotates the first and second clutch drum about said wheel axle means in opposing first rotational directions such that the first clutch drives said wheel axle means in a forward rotational direction while second clutch does not engage, and pivoting said lever arm in the opposite rotational direction to rotate the first and second said clutch drums about the wheel axle in second opposing rotational directions causing the second clutch to drive the wheel axle means in a forward rotational direction while the first clutch does not engage.

2. The wheel chair of claim 1, additionally comprising a tensioning pulley biased against said cable with pulley biasing means.

3. The wheel chair of claim 1, additionally comprising a turn buckle in said chain for adjusting chain tension.

4. The wheel chair of claim 1, wherein said wheel chair frame is collapsible and comprises:

two spaced apart wheels, each wheel being affixed to a wheel half-axle;

a seat made up of two U-shaped lateral seat support bars, each pivotally secured at its rearmost end to a corresponding upright lateral backrest support bars, such that one of the wheel half-axles fits through a passageway extending through the frame at the intersection of said seat support bars and said backrest support bars on each side of said chair;

a flexible seat fabric sheet extending between the lateral seat support bars;

a flexible backrest fabric sheet extending between the lateral backrest support bars;

a first rear strut pivotally connected to each of the backrest support bars and extending toward the center of said frame, where each said rear pivot strut is pivotally connected to a rearward interconnection bracket;

wherein the two said wheel half-axles are each pivotally connected at their inward ends to said rear interconnection bracket;

a forward interconnection bracket;

a second pivot strut pivotally connected to each said seat support bar and to a forward interconnection bracket;

such that said lateral seat and backrest support bars are pivotable on said pivot struts to fold toward each other to bring said chair into a compact storage configuration and to fold back away from each other to bring said chair into a operational configuration, while said flexible seat and backrest fabric sheets collapse and unfold with the folding and unfolding, respectively, of said chair;

and a forward wheel and forward wheel support means.

5. The wheel chair of claim 4, additionally comprising a generally L-shaped arm rest bar pivotally connected at one end to the corresponding said seat support bar and at the other end to the corresponding said backrest support bar, and an elongate arm platform connected to the upper surface of said arm rest bar;

said arm rest bars each including a break point joined with a pivot pin such that as said chair folds said back rest support bars pivot toward said seat support bars, and said arm rest bar pivots at said break point and at its connection points to the corresponding said arm rest support bar and the corresponding said seat support bar.

6. A wheel chair according to claim 4, wherein said forward wheel support means comprises:

foot rest bar pivotally having foot support means and being connected to said forward interconnection bracket by a pivot plate, pivotally secured to forward end of said forward interconnection bracket;

a central beam extending substantially along the longitudinal center of said chair, from front to rear, joining said forward and rearward interconnection brackets.

7. A wheel chair, comprising:

a wheel chair frame including a seat portion, axle means and two lateral wheels mounted to said axle means for rolling the wheel chair over a support surface;

and a manual propulsion mechanism comprising first and second clutches mounted to said wheel axle means, each said clutch having an outer clutch drum which engages and rotates an internal clutch core affixed to said wheel axle means when rotated in one direction and disengages said clutch core and spins freely when rotated in the opposing direction; a lever arm affixed to a lever arm axle rotatably fitted through the frame to a drive shaft having opposing first and second beveled ends with gear teeth, a laterally beveled drive gear secured to said lever arm axle meshing with said teeth on said first beveled end of said drive shaft, a first drive transmission gear drivably engaging said first clutch drum and a second drive transmission gear drivably engaging said second clutch drum, second drive transmission gears drivably engaging one of said clutch drums and meshing with gear teeth on said drive shaft second end, said clutch drums being configured such that their clutch drums engage their cores in opposing directions and drive the axle means;

such that pivoting said lever arm in one direction rotates the first and second clutch drum about said wheel axle means in opposing first rotational directions such that the first clutch drives said wheel axle means in a forward rotational direction while second clutch does not engage, and pivoting said lever arm in the opposite rotational direction to rotate the first and second said clutch drums about the wheel axle in second opposing rotational directions causing the second clutch to drive the wheel axle means in a forward rotational direction while the first clutch does not engage.

8. The wheel chair of claim 7, wherein said wheel chair frame is collapsible and comprises:

two spaced apart wheels, each wheel being affixed to a wheel half-axle;

a seat made up of two U-shaped lateral seat support bars, each pivotally secured at its rearmost end to a corresponding upright lateral backrest support bars, such that one of the wheel half-axles fits through a passageway extending through the frame at the intersection of said seat support bars and said backrest support bars on each side of said chair;

a flexible seat fabric sheet extending between the lateral seat support bars;

a flexible backrest fabric sheet extending between the lateral backrest support bars;

a first rear strut pivotally connected to each of the backrest support bars and extending toward the center of said frame, where each said rear pivot strut is pivotally connected to a rearward interconnection bracket;

wherein the two said wheel half-axles are each pivotally connected at their inward ends to said rear interconnection bracket;

a forward interconnection bracket;

a second pivot strut pivotally connected to each said seat support bar and to a forward interconnection bracket;

such that said lateral seat and backrest support bars are pivotable on said pivot struts to fold toward each other to bring said chair into a compact storage configuration and to fold back away from each other to bring said chair into a operational configuration, while said flexible seat and backrest fabric sheets collapse and unfold with the folding and unfolding, respectively, of said chair;

and a forward wheel and forward wheel support means.

9. The wheel chair of claim 8, additionally comprising a generally L-shaped arm rest bar pivotally connected at one end to the corresponding said seat support bar and at the other end to the corresponding said backrest support bar, and an elongate arm platform connected to the upper surface of said arm rest bar;

said arm rest bars each including a break point joined with a pivot pin such that as said chair folds said back rest support bars pivot toward said seat support bars, and said arm rest bar pivots at said break point and at its connection points to the corresponding said arm rest support bar and the corresponding said seat support bar.

10. A wheel chair according to claim 8, wherein said forward wheel support means comprises:

foot rest bar pivotally having foot support means and being connected to said forward interconnection bracket by a pivot plate, pivotally secured to forward end of said forward interconnection bracket;

a central beam extending substantially along the longitudinal center of said chair, from front to rear, joining said forward and rearward interconnection brackets.

* * * * *